Dec. 20, 1938.   G. B. WILLIAMS   2,140,727
BRAKE SHOE AND METHOD OF MAKING THE SAME
Filed Oct. 24, 1936
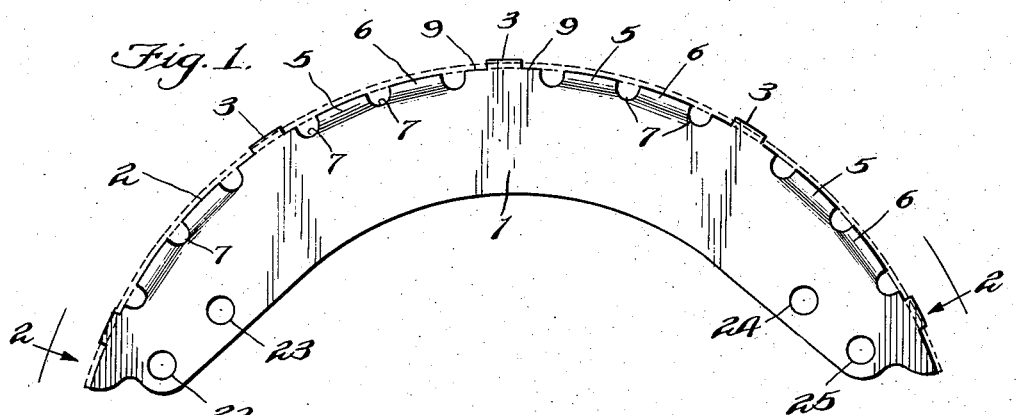
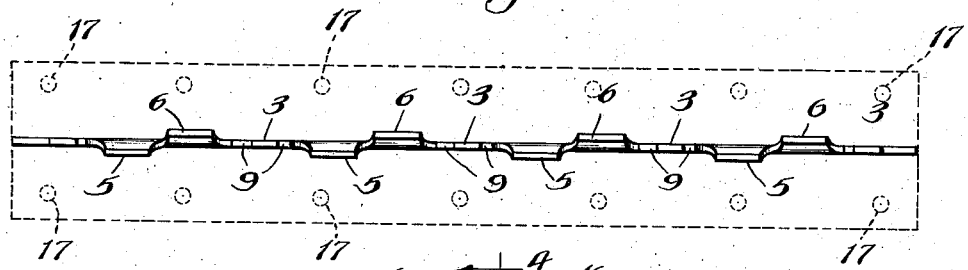
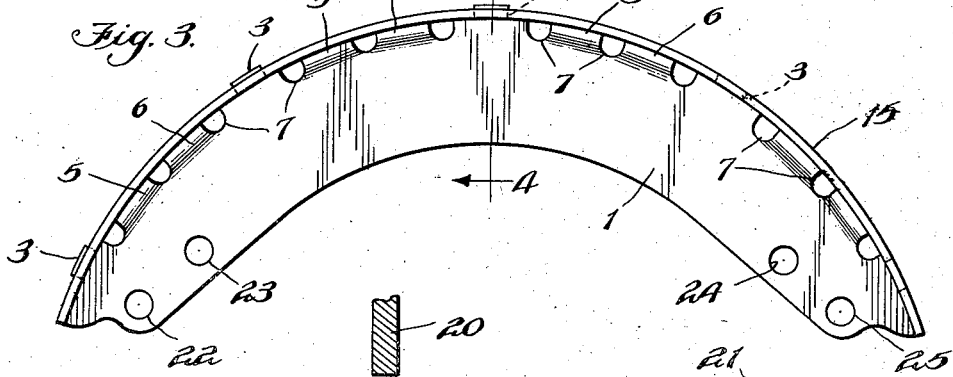
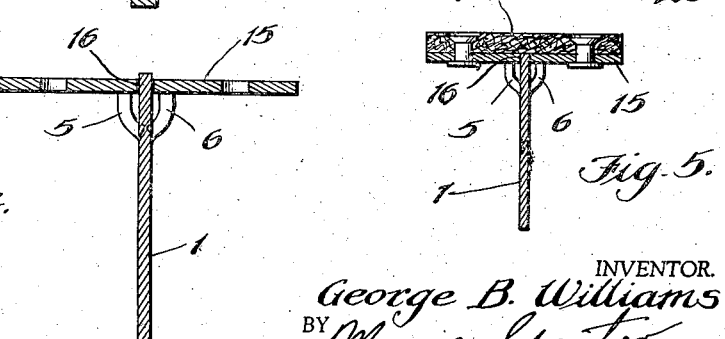
INVENTOR.
George B. Williams
BY Morris Spector
ATTORNEY.

Patented Dec. 20, 1938

2,140,727

UNITED STATES PATENT OFFICE 2,140,727

BRAKE SHOE AND METHOD OF MAKING THE SAME

George B. Williams, Rockford, Ill., assignor to L. J. Miley Company, Chicago, Ill., a corporation of Illinois Application October 24, 1936, Serial No. 107,449

6 Claims. (Cl. 29—152.1)

This invention relates to brake shoes and to a method of making the same.

More particularly, the invention is concerned with a brake shoe of the type comprising an arcuate band having a separately formed sheet metal stiffening member secured thereto along the inner face of the band. The present invention is concerned primarily with the method of and means for securing the arcuate band and the sheet metal stiffening member together. It is also concerned with the particular construction of the sheet metal stiffening member.

It is one of the objects of the present invention to provide a structural arrangement wherein the brake band and the stiffening member are secured together in a simple and reliable manner, with assurance that the two will not become separated.

It is a further object of the present invention to provide a brake shoe comprising two separate parts, as above mentioned, wherein the stiffening member is firmly held against any possible bending or flexing out of its normal or correct position. I accomplish the above results by forming the brake band and the stiffening member with a plurality of cooperating tongues and slots so that the two may be interfitted together, and I then permanently secure them together by swaging the tongues in the slots. The stiffening member is provided with a plurality of lateral projections on opposite sides thereof, along the edge which fits against the inner face of the brake band. These projections bear against the inner face of the brake band and thus hold the stiffening member or flange against flexing to one side or the other from its normal position.

The attainment of the above, and further objects of the present invention will be apparent from the following specification, taken in conjunction with the accompanying drawing forming a part thereof.

In the drawing:

Fig. 1 is a front view of the stiffening member for use in forming a brake shoe of the present invention;

Fig. 2 is a top view taken along the line 2—2 of Fig. 1, and showing the position of the brake band in dotted lines;

Fig. 3 illustrates the brake band and the stiffening web in position with some of the tongues already swaged in place;

Fig. 4 is a sectional view taken along the line 4—4 of Fig. 3, and

Fig. 5 is a view illustrating the brake shoe with the brake liner applied thereto.

Referring now more particularly to Figs. 1 and 2 of the drawing, the web or stiffening member, which is formed of sheet metal, is indicated at 1 and comprises a flat sheet having a generally arcuate surface 2 adapted to bear against the inner face of a brake band. A plurality of tongues 3 project outwardly from the edge of the stiffening member and are adapted to enter slots in the brake band, as will be more fully set forth as this description proceeds. The upper portion of the stiffening member has a plurality of arms formed therein, indicated at 5—5, extending in one direction from the surface of the main body 1, and a like number of similarly formed arms 6—6—6 extending in the other direction. These arms are formed by punching out small slots 7 in the metal and then flexing the metal between slots in opposite directions. The arrangement is such that on one side of each tooth 3 the metal is flexed to form an arm 5 extending in one direction, whereas on the other side of the tooth 3, the metal is flexed to form an arm extending in the opposite direction.

Adjacent each tooth 3 there is the end surface 9—9 which is not flexed in either direction. The edge surfaces 9—5—6 are along the same radius, as may be seen from Fig. 1.

The brake band comprises an arcuate band 15 having a series of slots 16 along the center thereof for receiving the teeth 3, and having a plurality of holes 17 whereby a brake lining may be secured to the band in any desired manner. The brake band is curved along a cylindrical arc. The brake band and the stiffening member are assembled together so that the teeth 3 extend through the slots 16 in the brake band. At that time the surfaces 9 on opposite sides of each slot bear against the inner face of the brake lining, as do also the outer edges of the arms 5 and 6. The thus assembled sheet metal parts are held in a suitable holder which grips the opposite faces of the sheet 1, and then the part of each tooth 3 which projects out of the slots 16 of the brake band is swaged in place by means of a speed hammer indicated at 20, which imparts a series of blows thereto. As the tooth is compressed longitudinally by the hammer, it expands transversely and laterally so that it is tightly swaged in the slot 16. The expanded tooth is thus tightly gripped by the walls of the slot 16 to secure the members 1 and 15 permanently together. Thereafter, a brake liner 21 is secured to the brake band in any desired manner, as by rivets.

It is to be noted that the arms 5 and 6 hold the stiffening member 1 and the brake band 15 against any possible flexing or swaying with respect to each other under the action of unbalanced forces that may be applied thereto.

The stiffening member 1 is shown as provided with a plurality of holes 22, 23, 24 and 25. This is conventional, the holes being provided for receiving the usual means for supporting and actuating the brake shoe. Usual plates may be welded to the stiffening member 1 at each pair of holes 22—23, and 24—25.

The brake shoe illustrated in the drawing is the usual type of internal brake shoe, well-known in the art, and may be used in various types of brake construction. The present invention is concerned with the particular way in which the reenforcing member 1 and the brake band 15 are secured together and held against relative bending, as well as separation.

In compliance with the requirements of the patent statutes I have here shown and described a preferred embodiment of the invention. It is, however, understood that the invention is not limited to the precise construction here shown, the same being merely illustrative of the principles of the invention. What I consider new and desire to secure by Letters Patent is:

I claim:

1. A blank for the web of a brake shoe, said blank comprising a generally arc shaped sheet having arms formed at the outer arcuate edge and extending laterally of the sheet on opposite sides thereof and having radial tongues between certain oppositely extending arms.

2. A blank for the web of a brake shoe, said blank comprising an arc shaped pressed metal sheet having an arcuate edge adapted to bear against the inner face of a brake band, the sheet being slit radially at a plurality of places along its arcuate edge, and distorted laterally along its arcuate edge and in the opposite direction on two sides of certain of the slits and having radially extending tongues between certain slits.

3. A blank for the web of a brake shoe, said blank comprising an arc shaped pressed metal sheet having an arcuate edge adapted to bear against the inner face of a brake band, the sheet being distorted laterally along its arcuate edge, and having projections from its arcuate edge and adapted to extend into openings in a brake band.

4. The method of making a brake shoe which comprises forming an arcuate band with a series of openings, forming an arcuate strengthening web with a corresponding series of projections at its arcuate edge, assembling the band and the web together with the arcuate edge of the web bearing against the inner face of the band and the projections extending into the openings, then hammering the projections in the openings in the band to lock the web and the band together.

5. The method of making a brake shoe which comprises forming an arcuate band with a series of openings, forming an arcuate strengthening web with a corresponding series of projections at its arcuate edge, assembling the band and the web together with the arcuate edge of the web bearing against the inner face of the band and the projections extending into the openings, then bringing the material of the projection and the surrounding band material into gripping relationship by mechanically expanding one said material toward the other while maintaining both substantially below the temperature at which softening of the materials takes place.

6. A brake shoe comprising an arcuate metal band having tongue-receiving slots, and an arcuate sheet metal web bearing against the inner face of the band, said web having tongues projecting from its arcuate edge and extending into the slots in the band, the metal of the band at the slots being stressed by the tongues and by said stress exerting a grip on the tongues to hold the web and band together.

GEORGE B. WILLIAMS.